United States Patent [19]
Hashimoto

[11] Patent Number: 4,837,809
[45] Date of Patent: Jun. 6, 1989

[54] TELEPHONE ANSWERING DEVICE HAVING IMMEDIATE PLAYBACK FUNCTION

[75] Inventor: Kazuo Hashimoto, Tokyo, Japan

[73] Assignee: Hashimoto Corporation, Tokyo, Japan

[21] Appl. No.: 219,001

[22] Filed: Jul. 14, 1988

[30] Foreign Application Priority Data

Jul. 14, 1987 [JP] Japan .................. 62-175449

[51] Int. Cl.4 .................................... H04M 1/65
[52] U.S. Cl. ........................ 379/79; 379/77; 379/75
[58] Field of Search ............ 379/70, 73, 74, 77, 379/79, 75; 360/74, 60, 74.4

[56] References Cited

U.S. PATENT DOCUMENTS 3,872,254  3/1975  Morata et al. ............... 379/77
4,400,586  8/1983  Hanscom ..................... 379/77
4,654,485  3/1987  Yamamoto .................... 379/77
4,672,659  6/1987  Hanscom ..................... 379/79
4,710,950 12/1987  Yamamoto .................... 379/70
4,713,835 12/1987  Bond et al. .................. 379/70

FOREIGN PATENT DOCUMENTS

2077075  5/1981  United Kingdom .
2077554  6/1981  United Kingdom .

Primary Examiner—Alan Faber
Attorney, Agent, or Firm—Lowe, Price, LeBlanc, Becker & Shur

[57]  ABSTRACT

A telephone answering device having an immediate playback function, wherein incoming messages from calling parties are successively recorded on an incoming message tape after sending of an outgoing message, and the recorded incoming messages can be successively played back immediately from the beginning of the incoming message tape, without rewinding, when a user operates the device manually or by remote control.

5 Claims, 3 Drawing Sheets

TELEPHONE ANSWERING DEVICE HAVING IMMEDIATE PLAYBACK FUNCTION

BACKGROUND OF THE INVENTION

The present invention relates generally to telephone answering devices and more particularly to such devices capable of immediately playing back an incoming message from a calling party without rewinding an incoming message tape.

Conventional telephone answering devices use various recording medium mechanisms for recording incoming messages. Most of said mechanisms require an operation of rewinding the incoming message tape to a certain position in order to play back the message. Thus, it takes much time at the time of message playback, in spite of a high rewinding speed to the beginning of the tape. Further, according to a driving circuit which is disclosed in JAPAN No. S43-18722 B1 invented by the same Applicant, the incoming messages are dubbed onto another tape so that there is no need of rewinding a message tape at the time of playback of the incoming messages. However, said driving circuit has a very complicated arrangement and so it is not suitable to use for home telephone answering devices.

SUMMARY OF THE INVENTION

It is an object of the present invention to provide a telephone answering device with a very simple mechanism and having no complicated functions such as a dubbing, wherein the incoming message from the calling party is recorded after the sending out of an outgoing message, and said recorded incoming message can be immediately played back without rewinding the incoming message tape when a user operates the device manually or remotely.

The above and other objects, features and advantages of the present invention will become more apparent from the following description when taken in conjunction with the accompanying drawings in which a preferred embodiment of the present invention are shown by way of illustrative example.

BEST MODE FOR PRACTICING THE INVENTION

A preferred embodiment of this invention is described in accordance with drawings as follows.

Figure 1:
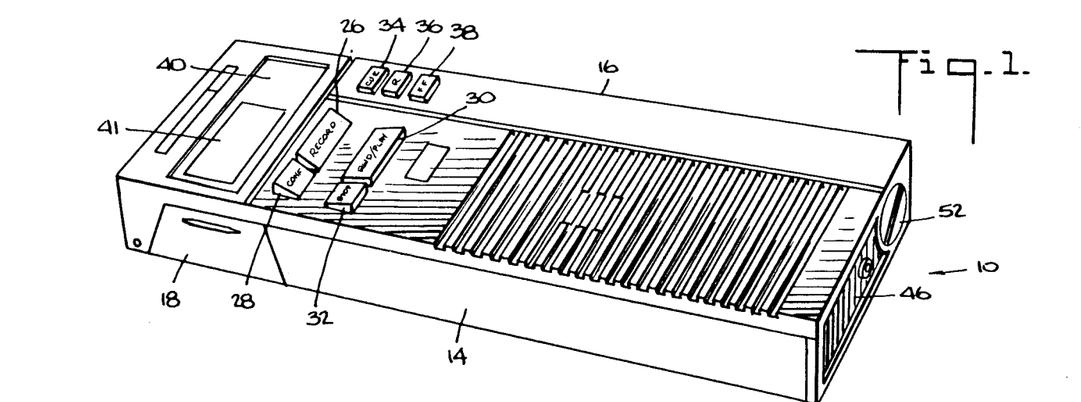
FIG. 1 a timing chart for showing the operation of a tape in one type of a conventional telephone answering device.

FIG. 1 shows a timing chart of Japanese Patent Publication No. 48-18722 which has been widely known. In the timing chart, there are an endless tape as a tape for an outgoing message and another endless tape for temporary recording, and a tape driving device for dubbing from the temporary recording endless tape for temporary recording to the dubbing tape for dubbing. When a telephone answering device receives a call, an outgoing message is played back from an outgoing message tape and is sent to the telephone line. A message on the temporary recording endless tape is dubbed to the dubbing tape. This operation is shown in the Japanese Publication No. 48-18722. However, in order to dub, play back, and hear the incoming message immediately, it is necessary to use a complicated tape driving device for dubbing messages.

Figure 2:
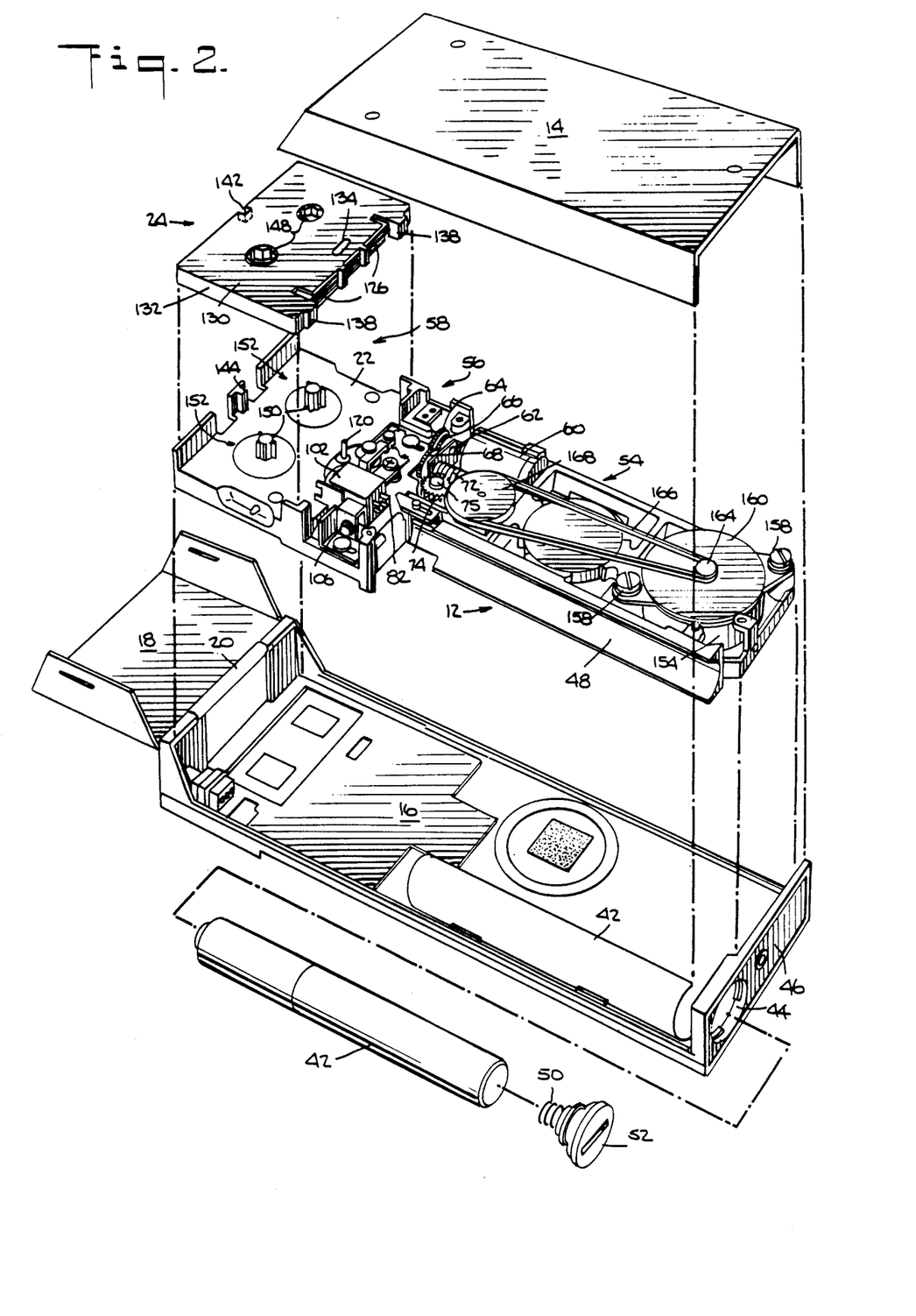
FIG. 2 is a timing chart for showing the operation of a tape in a conventional cassette type telephone answering device.

FIG. 2 shows a timing chart of a conventional single cassette driving device, wherein only one tape is used. A receiving section of the device cannot be driven while an answering section thereof is being driven, because there is a common tape for outgoing and incoming messages. As a result, this device is inconvenient for handling in practice.

Figure 3:
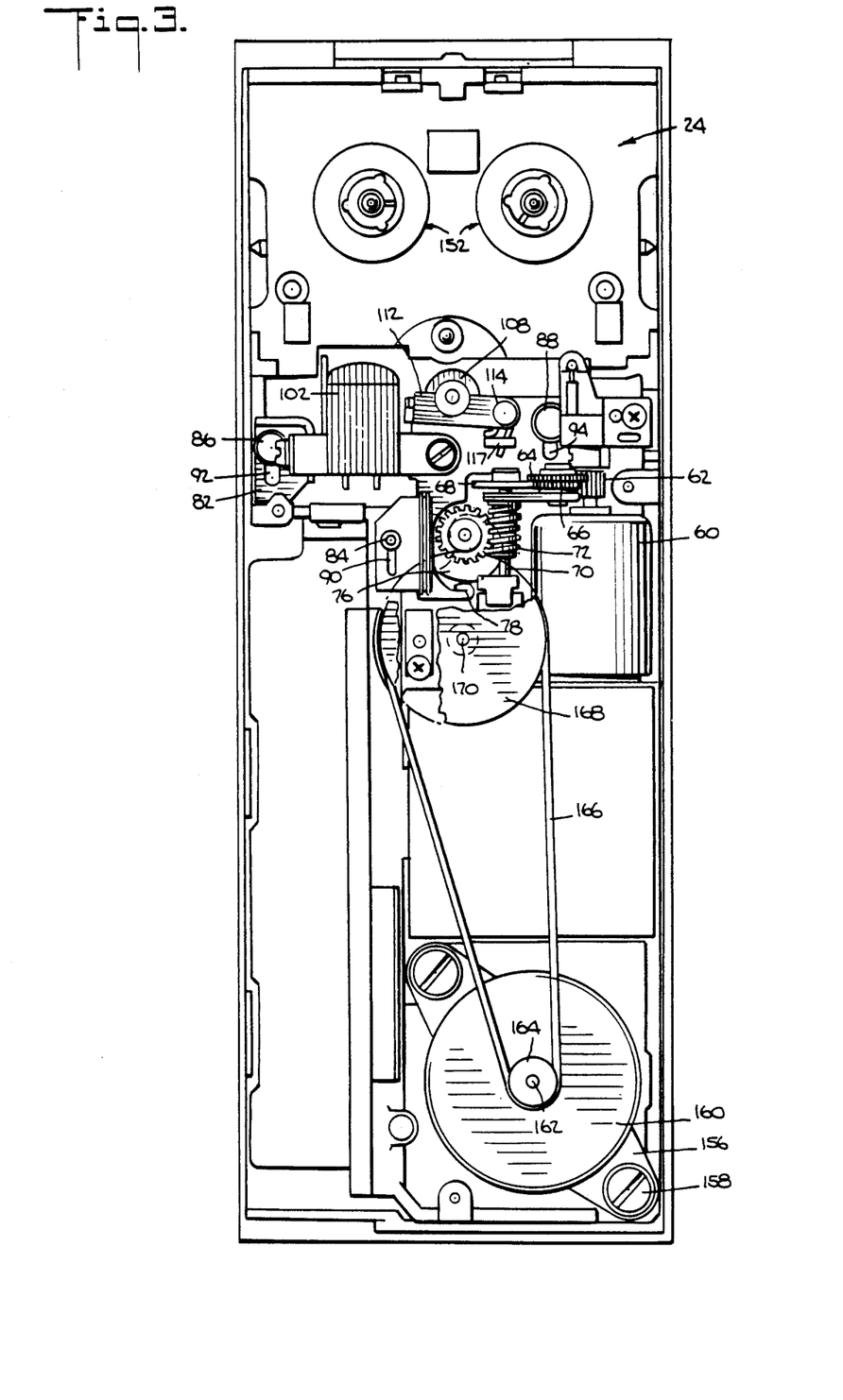
FIG. 3 is a block diagram showing the principles of a preferred embodiment of this invention.

FIG. 3 shows a block view of a preferred embodiment of this invention. L1 and L2 denote telephone lines. LT denotes a line transformer. 1 denotes a control section made of a microcomputer etc. 2 denotes a ringing circuit to detect a calling signal. Reference symbol R in the ringing circuit 2 denotes a terminal for resetting. Reference symbol ↓in the ringing circuit 2 denotes a terminal for switching whereby relay Y-1 is set to "ON" by one calling signal or three calling signals. Reference symbol ON in the ringing circuit 2 denotes an input terminal for setting the relay Y-1 to "ON" by a signal except the calling signal, namely, a digital signal from the control section 1. Reference symbol ON is used for setting the telephone line to talking condition while the incoming message tape is rewound. Moreover, the ringing circuit has an on-hook detector circuit which detects on-hook operation by a caller. When a caller has operated on-hook operation only by listening to an outgoing message, the relay Y-1 is restored. As a result, this device is not switched to the incoming message tape T-2. When the on-hook detector circuit is not operated, the relay Y-1 is restored by output from VOX circuit which will be explained later). Y-1 denotes a relay for closing. 8 denotes an OGM recording and playback section (T-1) for an outgoing message. 3 denotes an amplifier. 4 denotes a VOX circuit. 5 denotes an amplifier. 6 denotes a memory RAM (random access memory) for memorizing a position of an incoming message tape T-2, wherein one byte (one bit is used in practice) in the memory RAM is used as a memory which memorizes whether or not an incoming message is recorded in the incoming message tape T-2. 7 denotes a rotation sensor for outputting a tape position as pulses. 9 denotes a remote control signal receiving section which receives a remote control signal sent by a caller. PLAY and SD denote a solenoid for sending the tape for an incoming message T-2 in the normal direction. RW and SD denote a solenoid for rewinding the incoming message tape T-2. FF and SD denote a solenoid for forwarding the tape for an incoming message T-2. M denotes a motor for driving. 10 denotes a delay circuit which delays a time of 2–3 seconds; when a calling signal is input to a telephone line, the solenoid for forwarding the tape FF.SD is driven through the delay circuit 10. 11 denotes a signal sound oscillated circuit. 12 denotes a selective switch whereby it is switched whether an incoming message recorded on the incoming message tape is recorded from the physical beginning point (zero mode) or is recorded continuously after the incoming message is listened to (accumulate mode).

When this device is set at a waiting condition, a motor M, and a solenoid for rewinding RW, SD are driven, and an incoming message tape is rewound to its beginning point, detected by a lack of pulses from the rotation sensor 7 which determines whether or not the incoming message tape is rewound.

When the telephone answering device receives a call at a waiting condition with the tape for an incoming message T-2 at the beginning point, the calling signal is detected by the ringing circuit 2. When a message is not recorded on the incoming message tape T-2, a specific output of one byte from the RAM 6 is "0" (which will be explained later). As a result, the relay Y-1 is set to "ON" by a three time calling signal and the telephone line is set to the closed condition by a point of contact Y1-1.

An outgoing message is output from an OGM recording and playback section 8 and is sent to a caller through the amplifier 3. When sending of an outgoing message is finished, an input message from the first caller is recorded at the distance from t0–t1 as shown in the FIG. 4, because in the first receiving call, the incoming message tape is at the beginning point.

An on-hook operation by a caller restores the relay Y-1 by on-hook detector circuit in the ringing circuit 2 or by the reset terminal R in the ringing circuit 2 by an output from the VOX circuit 4. A tape position t-1 of the incoming message tape T-1 is memorized in the memory RAM by memorizing a pulse from the rotation sensor 7 through the control section 1. A specific one byte of the RAM is set to "1", and it is memorized to record a message on the incoming message tape T-2 at the same time. After that, a solenoid RW and SD for rewinding are driven, and the incoming message tape is rewound to the beginning point. Then, the telephone answering device cannot receive a call from the outside during tape rewinding. While the tape is being rewound, the relay Y-1 is driven through a terminal ON, and the telephone line is set to a closed condition and the telephone line is busy to incoming calls during this time.

Figure 4:
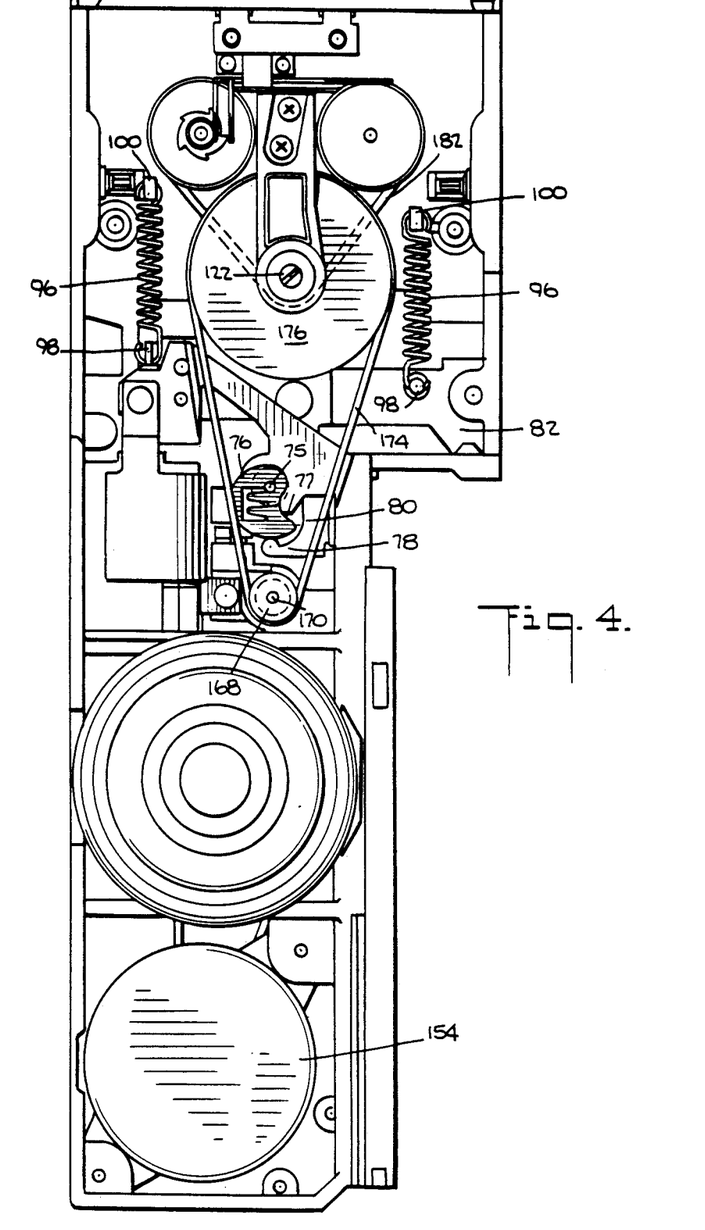
FIG. 4 is a timing chart of the incoming message tape of a preferred embodiment of this invention.
Figure 5:
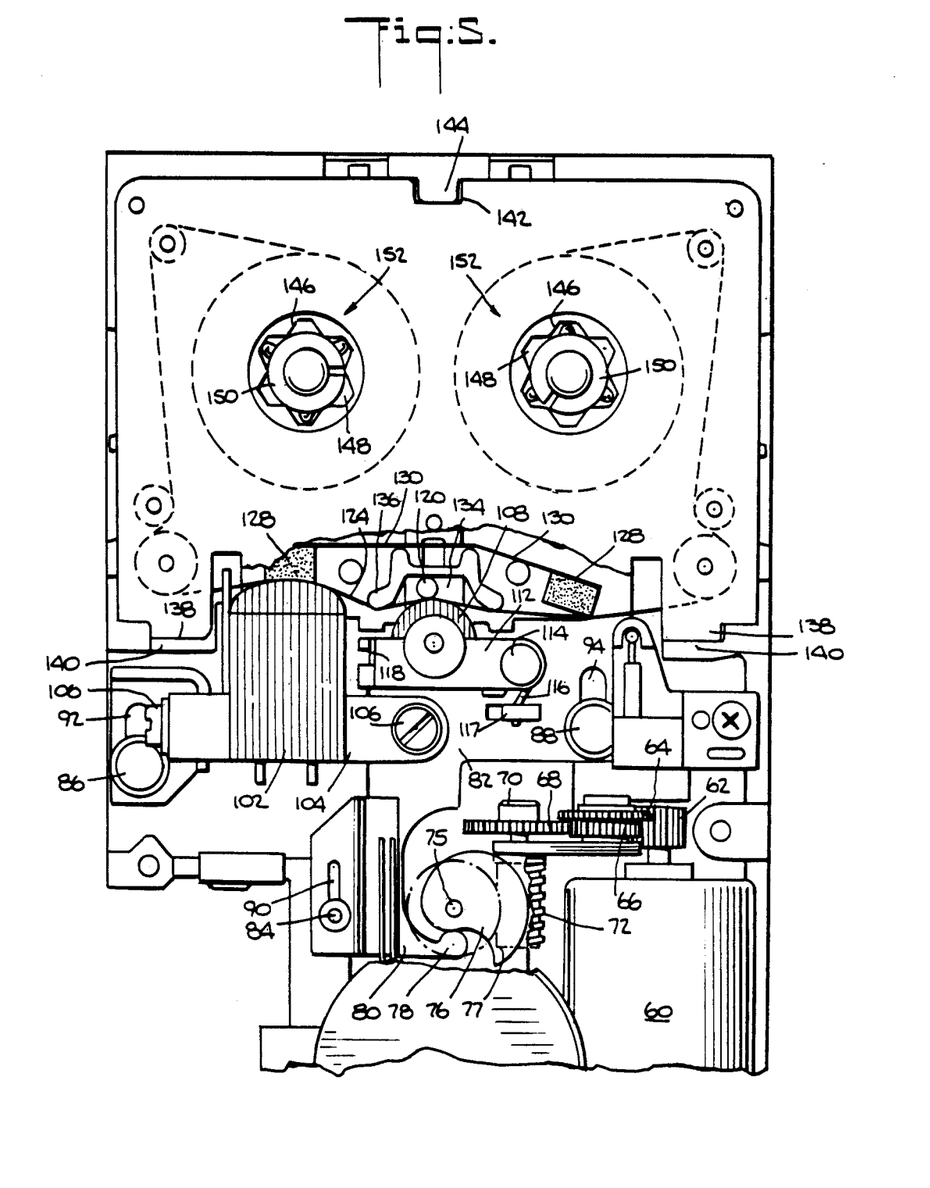
Figure 6:
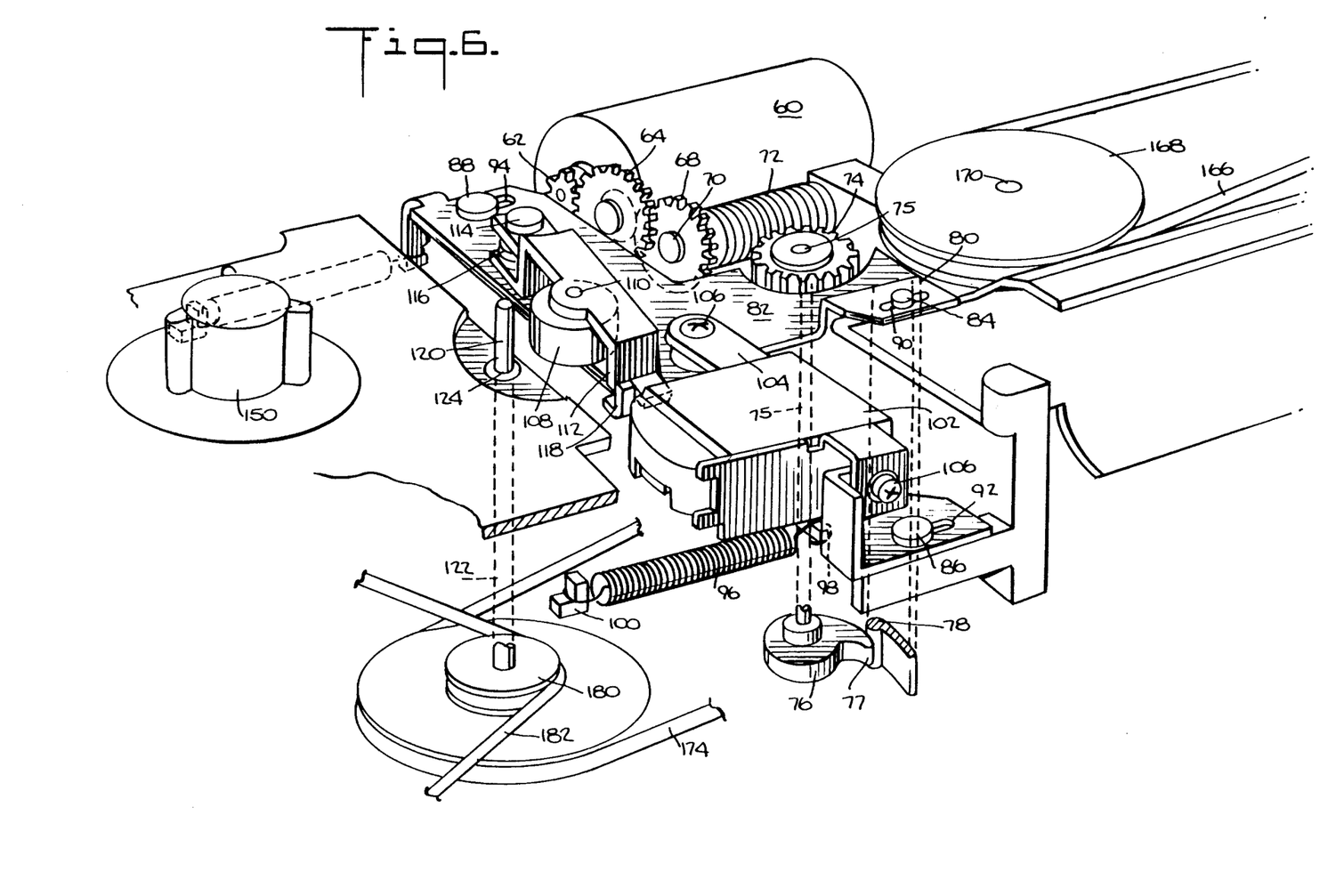
Figure 7:
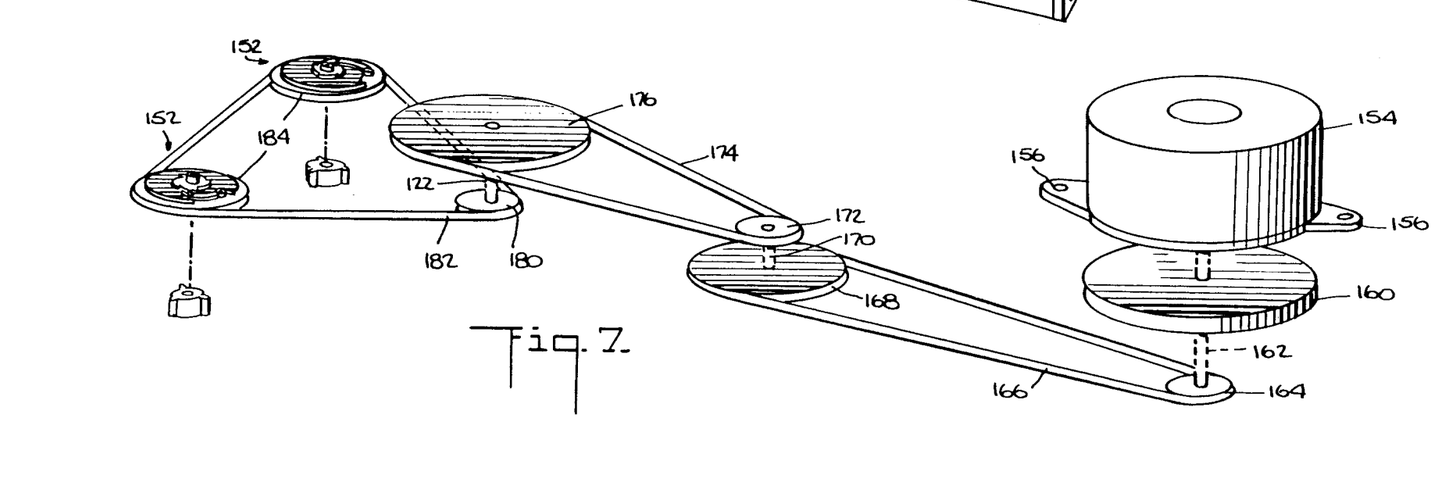
Figure 8:
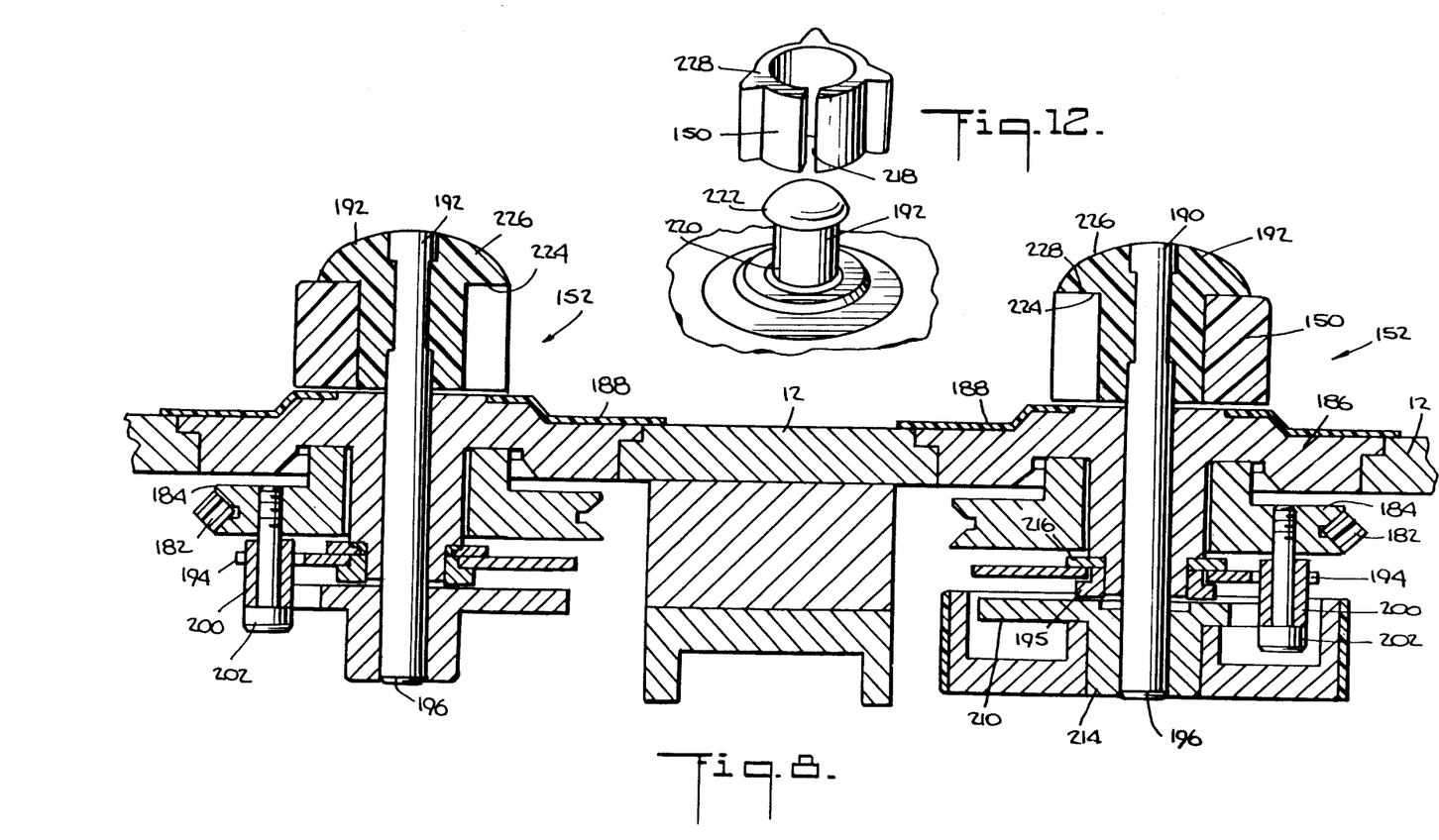
Figure 9:
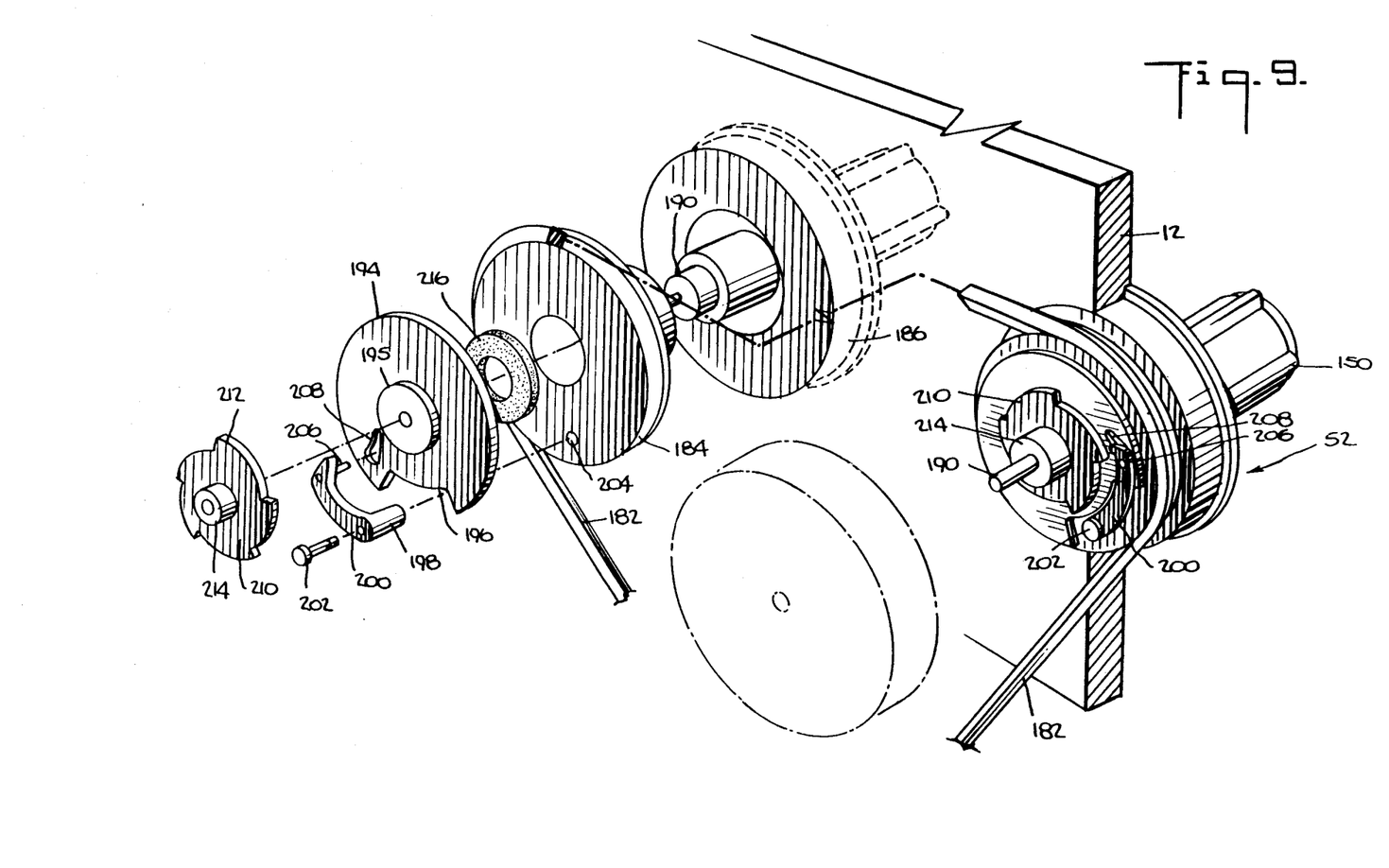

The telephone answering device receives a next call from the outside and an outgoing message is sent. The solenoid for forwarding the tape FF.SD is driven after 2–3 seconds through the delay circuit 10 from the starting point of sending an outgoing message. The incoming message tape is fast forwarded to the point t1. When sending of an outgoing message is finished, an incoming message from a caller is recorded at the distance from t1 to t2 as shown in FIG. 4. After that, the telephone answering device is restored and the incoming message tape is rewound continuously to the beginning point.

This operation is repeated, and a message of T2-1–T2-n is stored on the tape for an incoming message T-2. Moreover, when this device is not operated, the incoming message tape is always set at the beginning point. As a result, when an owner switches to the play back condition by a manual operation after going back home, it is possible to play back the message tape at once without rewinding it. When the device is set to its "standby condition" and is set to "on-hook" while an outgoing message is sent without an incoming message from a caller even if the device receives a call, this "on-hook" operation is detected by ringing circuit 2 as above, and the relay Y-1 for closing is set to "OFF". The "OFF" of the relay Y-1 is monitored by the control section 1. Unnecessarily rewinding the incoming message tape is not carried out, even if the device is on zero mode or on accumulate mode.

When an incoming message is recorded near the end of the incoming message tape, forwarding the incoming message tape is not finished. In the above condition, a beep tone or a signal sound like a music box (orgel) is sent from the signal sound oscillated circuit 11 until forwarding of the tape is finished after sending of an outgoing message is completed.

An owner may listen to incoming messages recorded on the incoming message tape by remote control using a remote telephone. When an incoming message is recorded, the telephone line is closed by one calling signal corresponding to an output from the RAM as above. But when an incoming message is not recorded on the incoming message tape T-2, the telephone line is closed by three calling signals. Accordingly, in this condition, a telephone fee and time can be saved by hanging up the telephone within three calling signals. When an incoming message is recorded, a remote control signal is sent in 2–3 seconds after sending of an outgoing message is started. In this condition, the incoming message tape is not set to a "forwarding condition" and stops at the beginning point of the tape as is clear by the above explanation. The remote control signal is detected by the remote control receiving section 9, and drives the solenoid for sending the tape PLAY.SD through the control section 1. It is thus now possible to play back recorded incoming message immediately without rewinding the incoming message tape.

Details of the playback process, being well known, are omitted. When an operator forwards the incoming message tape by manual operation after he returns home, or when an operator sends a remote control signal for forwarding by remote control operation, the delay circuit 10 is not used, and the control section 1 drives the solenoid FF.SD for forwarding the tape directly.

In the foregoing explanation, when this device is set to the waiting condition, the incoming message tape is rewound to the beginning point (called 0 mode). However, the tape position of an incoming message recorded last is recorded in the RAM 6, so that it is possible to record a new incoming message after the incoming message recorded in the RAM (accumulate mode).

As above, as being compared with the conventional telephone answering devices which needed dubbing operation in order to play back a message on a tape for an incoming message immediately, this device can play back a message on the incoming message tape without a dubbing operation and accordingly is very effective.

In this disclosure, there is shown and described only the preferred embodiment of the invention, but, as aforementioned, it is to be understood that the invention is capable of use in various other combinations and environments and is capable of changes or modifications with in the scope of the inventive concept as expressed herein.

What is claimed is:

1. A telephone answering device adapted to be connected to a telephone line and having an immediate playback function, comprising:
    means for sending a prerecorded outgoing message to a calling party followed by a beep tone in response to an incoming call;
    means for starting to drive an incoming message tape to a first suitable recording position after a predetermined period of time, for instance, a couple of seconds, during said sending of the outgoing message;
    means for recording an incoming message from the calling party on the incoming message tape from said first suitable recording position according to the beep tone generated after said sending of the outgoing message;

means for rewinding the incoming message tape to a beginning position thereof after the recording of said incoming message is completed;

means for fast forwarding said incoming message tape to a second suitable recording position following said first suitable recording position after the predetermined period of time in response to next incoming call;

means for recording the incoming message from said second suitable recording position on the incoming message tape according to the beep tone generated after the sending of the outgoing message; and means for rewinding again the incoming message tape to said beginning position thereof after said recording, whereby when a user returns to his home or he remotely operates the device from a remote location after the incoming messages from the calling parties are successively recorded, said recorded incoming messages can be played back immediately from the beginning position of the incoming message tape.

2. A telephone answering device having an immediate playback function, according to claim 1, including means for selecting between a 0 mode wherein the first suitable recording position on the incoming message tape is the beginning position thereof and an accumulate mode wherein the first suitable recording position is a recording position after the immediately previous incoming message.

3. A telephone answering device having immediate playback function, according to claim 1, including means operative while the incoming message tape is being rewound to the beginning position thereof for maintaining the telephone line engaged so that the telephone line is busy to incoming calls.

4. A telephone answering device having an immediate playback function, according to claim 1, including means operative when no message is newly recorded on the incoming message tape for setting the incoming message tape to a latest recording position thereof without rewinding and simultaneously placing the device in a standby mode ready to receive a subsequent incoming call.

5. A telephone answering device having immediate playback function, according to claim 1, wherein if said incoming message tape has not reached new recording position by fast forwarding while said outgoing message is sent out to the calling party, a signal tone is sent out to the calling party after said sending of the outgoing message is completed and until said incoming message tape has reached the new recording position.

* * * * *